United States Patent
Best et al.

(10) Patent No.: US 11,502,047 B2
(45) Date of Patent: Nov. 15, 2022

(54) PACKAGING TECHNIQUES FOR BACKSIDE MESH CONNECTIVITY

(71) Applicant: Cryptography Research, Inc., Sunnyvale, CA (US)

(72) Inventors: Scott C. Best, Palo Alto, CA (US); Ming Li, Fremont, CA (US)

(73) Assignee: Cryptography Research Inc., San Jose, CA (US)

( * ) Notice: Subject to any disclaimer, the term of this patent is extended or adjusted under 35 U.S.C. 154(b) by 132 days.

(21) Appl. No.: 16/645,353

(22) PCT Filed: Sep. 7, 2018

(86) PCT No.: PCT/US2018/049939
§ 371 (c)(1),
(2) Date: Mar. 6, 2020

(87) PCT Pub. No.: WO2019/055307
PCT Pub. Date: Mar. 21, 2019

(65) Prior Publication Data
US 2021/0035924 A1 Feb. 4, 2021

Related U.S. Application Data

(60) Provisional application No. 62/592,159, filed on Nov. 29, 2017, provisional application No. 62/559,405, filed on Sep. 15, 2017.

(51) Int. Cl.
*H01L 23/00* (2006.01)
*G06F 21/87* (2013.01)
*H04L 9/08* (2006.01)

(52) U.S. Cl.
CPC ............ *H01L 23/576* (2013.01); *G06F 21/87* (2013.01); *H01L 24/16* (2013.01); *H01L 24/48* (2013.01); *H04L 9/0866* (2013.01)

(58) Field of Classification Search
CPC ....... H01L 23/576; H01L 24/16; H01L 24/48; H01L 2224/16225; H01L 2224/48091;
(Continued)

(56) References Cited

U.S. PATENT DOCUMENTS

| 7,710,286 B1 | 5/2010 | Thornley et al. |
| 7,868,441 B2 | 1/2011 | Eaton et al. |

(Continued)

FOREIGN PATENT DOCUMENTS

WO WO-01-50530 A1 7/2001

OTHER PUBLICATIONS

EP Extended European Search Report dated Mar. 30, 2021 re: EP Appln. No. 18856300.1. 9 pages.
(Continued)

*Primary Examiner* — Thao X Le
*Assistant Examiner* — Laura M Dykes
(74) *Attorney, Agent, or Firm* — Lowenstein Sandler LLP

(57) ABSTRACT

The embodiments herein are directed to technologies for backside security meshes of semiconductor packages. One package includes a substrate having a first interconnect terminal of a first type and a second interconnect terminal of a second type. The package also includes a first security mesh structure disposed on a first side of an integrated circuit die and a conductive path coupled between the first interconnect terminal and the second interconnect terminal. The first security mesh structure is coupled to the first interconnect terminal and the second interconnect terminal being coupled to a terminal on a second side of the integrated circuit die.

9 Claims, 6 Drawing Sheets

(58) Field of Classification Search
CPC . H01L 2224/48227; H01L 2224/73257; H01L 2924/15192; G06F 21/87; H04L 9/0866; H04L 9/3278; H04L 2209/12; H04L 9/003; G09C 1/00
USPC ........................................................ 257/696
See application file for complete search history.

(56) References Cited

U.S. PATENT DOCUMENTS

| | | |
|---|---|---|
| 7,898,090 B1 | 3/2011 | Eaton |
| 8,502,396 B2 | 8/2013 | Buer et al. |
| 9,030,226 B2 | 5/2015 | Plusquellic et al. |
| 2002/0017728 A1 | 2/2002 | Ramalingam et al. |
| 2008/0251906 A1 | 10/2008 | Eaton et al. |
| 2010/0026506 A1 | 2/2010 | Bartley et al. |
| 2010/0140789 A1 | 6/2010 | Trasporto et al. |
| 2012/0056635 A1* | 3/2012 | Oomura ............... H04L 9/3234 324/713 |
| 2012/0273945 A1 | 11/2012 | Chang |
| 2013/0141137 A1 | 6/2013 | Krutzik et al. |
| 2014/0175637 A1* | 6/2014 | Stuber ................. H01L 25/0657 257/737 |
| 2015/0137340 A1 | 5/2015 | Buer et al. |
| 2016/0188296 A1 | 6/2016 | Plusquellic |
| 2017/0024339 A1* | 1/2017 | Watanabe ............. H04L 9/0662 |
| 2018/0278418 A1* | 9/2018 | Chang ................... H04L 9/0891 |

OTHER PUBLICATIONS

Notification Concerning Transmittal of International Preliminary Report on Patentability dated Mar. 26, 2020 re: Int'l Appln. No. PCT/US18/049939. 7 Pages.

Notification of Transmittal of the International Search Report and the Written Opinion of the International Searching Authority, or the Declaration dated Dec. 14, 2018 re: Int'l Appln. No. PCT/US18/049939. 15 Pages.

* cited by examiner

APPLY, BY WAY OF A FIRST FIRST-LEVEL TO BACKSIDE INTERCONNECTION, AN ELECTRICAL STIMULUS TO A BACKSIDE METAL LAYER
502

RECEIVE A RESPONSE TO THE ELECTRICAL STIMULUS THAT IS BASED AT LEAST IN PART ON AN ELECTRICAL CHARACTERISTIC OF THE BACKSIDE METAL LAYER
504

EVALUATE A PHYSICALLY UNCLONABLE FUNCTION (PUF) THAT OUTPUTS, BASED AT LEAST IN PART ON THE ELECTRICAL CHARACTERISTIC OF THE BACKSIDE METAL LAYER, A FIRST FINGERPRINT VALUE WHEN THE BACKSIDE LAYER HAS NOT BEEN MODIFIED, WHERE THE PUF IS CONFIGURED TO OUTPUT, BASED AT LEAST IN PART ON THE ELECTRICAL CHARACTERISTIC OF THE BACKSIDE METAL LAYER, A SECOND FINGERPRINT VALUE THAT IS NOT EQUAL TO THE FIRST FINGERPRINT VALUE IF THE BACKSIDE METAL LAYER HAS BEEN MODIFIED
506

US 11,502,047 B2

PACKAGING TECHNIQUES FOR BACKSIDE MESH CONNECTIVITY

RELATED APPLICATIONS

This application claims the benefit under 35 U.S.C. § 371 of International Patent Application No. PCT/US2018/049939, filed Sep. 7, 2018, which claims the benefit of U.S. Provisional Application No. 62/592,159, filed Nov. 29, 2017, and claims the benefit of U.S. Provisional Application No. 62/559,405, filed Sep. 15, 2017, the entire contents of all are incorporated by reference in their entirety.

BACKGROUND

Systems that operate on sensitive data need to protect against the unauthorized access to, or disclosure or alteration of, such data by attackers. Attackers who gain access to cryptographic keys and other secrets could steal or tamper with the sensitive data, leading to severe consequences such as subversion of critical operations of the system through the introduction of unauthorized commands and the exposure of confidential or proprietary information. One compromised element may also be used to mount further attacks, endangering other elements of a system. An attacker can monitor a device's external characteristics such as operation timing, power consumption, and/or electromagnetic radiation and use this additional information to extract the secret keys being used within the device. External monitoring of a device performing a sequence of cryptographic operations using the same set of keys with different data can result in the leakage of the key. Some external monitoring is considered non-invasive or passive, or semi-invasive (e.g., thermal imaging). In other cases, an attacker can also perform invasive reverse engineering techniques to gain physical access to the circuit to monitor electrical signals.

BRIEF DESCRIPTION OF THE DRAWINGS

The present disclosure is illustrated by way of example, and not by way of limitation, in the figures of the accompanying drawings.

FIG. 5 is a flowchart illustrating a method of detecting modifications to a backside metal layer according to one embodiment.

DETAILED DESCRIPTION

Figure 1A:
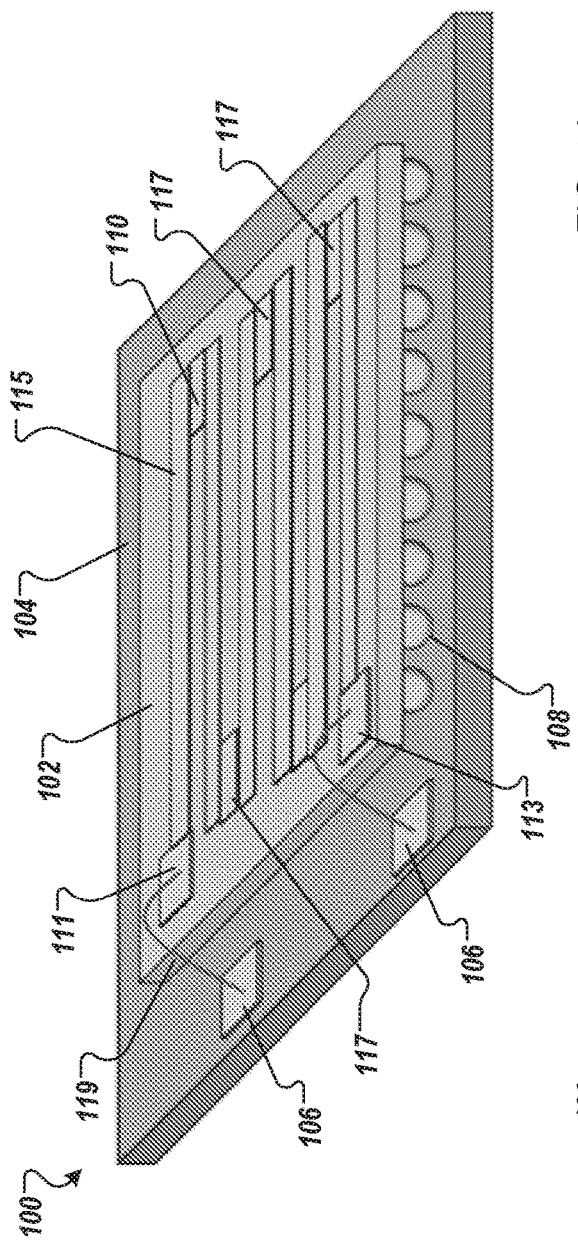
FIG. 1A is a perspective top-down view of a chip on a substrate with wirebond pads and substrate pads connecting active circuitry on a front-side of the chip to a tamper prevention structure on a backside of the chip according to one embodiment.

Many electronic devices (e.g., cell phones, tablets, set-top boxes, etc.) use integrated circuits that have secure cryptographic keys and secure cryptographic circuitry. These keys and circuitry may be used, for example, to secure data on the device, to secure communication, and/or to authenticate the device. It is desirable to protect the keys and/or other information used by the device from disclosure (thereby protecting the data on the device, preventing unauthorized use, etc.)

When an attacker has physical access to the integrated circuit (e.g., by purchasing a device), attacks designed to learn the secure cryptographic keys and/or circumvent the secure cryptographic circuitry can be carried out by modifying an integrated circuit (also referred to herein as "chip") in some manner. A chip may be modified for the purposes of these attacks using, for example, a focused ion beam (FIB) workstation. A FIB machine can cut tracks in a chip's metallization layer, deposit new metal tracks, deposit new isolation layers, remove material (e.g., bulk silicon) to facilitate probing of circuits and signals, implant ions to change the doping of an area of silicon, and build conductors to structures in the lower layers of the chip. One or more of these types of modifications can be used to help learn the secure cryptographic keys and/or circumvent the secure circuitry.

To prevent an adversary from monitoring the electrical signals on a security chip, it is common practice to cover those chips with a security mesh. That is, the top-layer metal on the front side of the chip is patterned in such a way that it obscures the important circuit structures underneath. By implementing a mesh, an adversary who wanted to electrically probe the signals (e.g., to recover secret contents during chip operation) would first need to remove the mesh, which requires significantly more time and effort than simple probing (especially if the mesh is continuously being monitored for correct electrical continuity), and further creates risk that they will damage the die they are trying to analyze. A secondary benefit to a mesh in the top-layer metal is that it absorbs infrared emissions from the circuits beneath the metal; this characteristic can prevent other non-invasive reverse engineering techniques, as infrared emissions can be used to recover the state of digital circuits, for example SRAM contents.

The embodiments herein describe packaging techniques or technologies for backside mesh connectivity for preventing an adversary from monitoring electrical signals on a security chip (also referred to as a monolithic integrated circuit or IC). By providing backside mesh connectivity, the benefits of using a security mesh formed on the front side of the chip can also apply to the backside of the chip. The backside mesh connectivity can also provide additional benefits as described herein.

In one embodiment, a package includes a substrate having a first interconnect terminal of a first type and a second interconnect terminal of a second type. The substrate also includes an electrical trace that establishes a conductive path between each pair of two terminals. The package also includes an integrated circuit (IC) die which itself has both a first metal layer structure disposed on a first side that is coupled to an interconnect terminal of the first type, as well as a second metal layer structure disposed on a second side that is coupled to an interconnect terminal of the second type. During package assembly, the interconnect terminal of the first type on the IC die is coupled to the first interconnect terminal on the substrate, while the interconnect terminal of the second type on the IC die is coupled to the second interconnect terminal on the substrate. The first metal layer structure on the IC can be a first security mesh (e.g., backside security mesh) and a second metal layer structure on the IC can be a second security mesh (e.g., front-side security mesh). The integrated circuit die typically includes active and passive circuitry (e.g., transistors, diodes, resistors, capacitors, etc.) only on the second side, while the first side (e.g., the backside) only includes metal structures.

In a flip-chip configuration, the first side is a backside of the integrated circuit die. In this configuration, the second interconnect type (on both the and the package substrate) may be a controlled collapse chip connection (C4) pad and the first interconnect type (on both the IC package and the package substrate) may be a wirebond pad. During packaging, a wire is coupled between the two wirebond pads (i.e., from the first side of the IC and the substrate) while a solder bump is coupled between the two C4 pads (i.e., from the second side of the IC and the substrate). Via this connectivity, the first metal layer structure on the backside of the IC can be coupled to active circuitry on the front side of the IC via the wirebond, the conductive path on the substrate, and the C4 pad, as described herein. Alternatively, both the first and second interconnect terminal types may be other types of first-level interconnects (i.e., interconnects which are used to attach the to the package substrate, as compared to second-level interconnects which attach the package to the external PC board). Other types of first-level interconnect packaging, includes, for example, copper pillar, fan-out wafer-level packaging, chip-scale packaging (e.g., Wafer Level Chip Scale Packaging (WLCSP)), Package-on-Package (PoP), wafer bumping, or the like. These other types of packages can be used when security meshes can be used on one or both sides of an integrated circuit die and connection can be made from a backside metal mesh at a backside of the integrated circuit die to a package substrate which is attached to a front-side metal mesh at a front side of the integrated circuit die, or vice versa.

The first side (e.g., backside) of the IC may not include active circuitry. But since the front side and the backside are electrically coupled after utilizing the techniques explained herein, a circuit at the front side of the integrated circuit die can check electrical continuity of the first metal layer structure or the second metal layer structure, or both. The circuit can measure an impedance of at least one of the first metal layer structure, an impedance of the second metal layer structure, or both. These values can be compared against stored impedance values to detect modifications to the first metal layer structure or the second metal layer structure by an attacker. When a change is detected, the circuit can prevent cryptographic operations by the integrated circuit to prevent theft of sensitive data. For example, a first circuit performs a cryptographic operation and a second circuit measure a first impedance of the first metal layer structure and compares the first impedance against a first stored impedance value corresponding to the first metal layer structure to detect a change in the first metal layer structure. Similarly, a second impedance can be measured and compared against a second stored impedance value to detect a change in the second metal layer structure. The second circuit disables the cryptographic operation by the first circuit when there is a change in the first metal layer structure, a change in the second metal layer structure, or both.

In another embodiment, the first metal layer structure, the second metal layer structure, or both can be used in connection with a physically unclonable function (PUF) circuit. The PUF circuit can be used to generate a fingerprint value based on the uniqueness of the physical characteristics of a tamper prevention (i.e., shielding) structure that includes metallization on the backside of the integrated circuit. The physical characteristics depend on random physical factors introduced during manufacturing. This causes the chip-to-chip variations in these physical characteristics to be unpredictable and uncontrollable which makes it virtually impossible to duplicate, clone, or modify the structure without changing the fingerprint value. Thus, by including the metallization on the backside of the integrated circuit as part of the PUF circuit, the backside of the chip can be protected from modifications and/or observations that can be used to help learn the secure cryptographic keys and/or circumvent the secure circuitry. In one embodiment, the PUF circuit outputs a first fingerprint value and any modification of an electrical characteristic (e.g., resistance, inductance, connectivity, capacitance, etc.) of the first metal layer structure, the second metal layer structure, or both causes the circuit to output a second fingerprint value that is not equal to the first fingerprint value. In a further embodiment, a key generation circuit can be used in connection with the PUF circuit to derive a key for a cryptographic function at least in part on the first fingerprint value. Any modification to an electrical characteristic of the first metal layer structure (and/or the second metal layer structure) results in a second fingerprint value that derives a second key that is not equal to the key. As such, the first metal layer structure, in connection with the PUF circuit and key generation circuit, can create a self-destructing key. In the event that an attacker modifies the first metal layer structure, the key will be destroyed before it can be compromised.

The most common approach to making electrical contact to the backside of a chip is by using "through silicon vias", also known as, "TSVs". The difficulty with TSVs is that they are an esoteric technology that is not widely supported, and are therefore relatively high cost. Some solutions that use TSVs to connect the circuitry on a front side of the integrated circuit to a backside may thin a height of the substrate. The thinning of the substrate can help an adversary in that the adversary could use a FIB tool and not need as high of aspect ratio to gain access to the digital circuits on the front side of the integrated circuit. The proposed approach in the embodiments herein uses a lower-cost packaging technique. In some embodiments, the chip is fabricated normally, using flip-chip bonding pads on the front side of the die. Some of these flip-chip pads (aka, "C4" pads) will be used for making connections to the backside of the chip; others will be used for normal chip connectivity (e.g., power, ground and input-output (IO)). After normal fabrication, the wafer may be patterned with metal on the backside of the chip, using a fairly low-cost "redistribution layer" (aka, "RDL") process. The wafer can be diced and the individual chips are attached to a flip-chip substrate which provides lateral connectivity between some of the flip-chip pads to some wire-bond pads also on the substrate. The packaging may also include connecting wirebonds between these substrate pads and the wirebond pads patterned on the backside of the chip, such as illustrated in FIGS. 1A-1B.

Figure 1B:
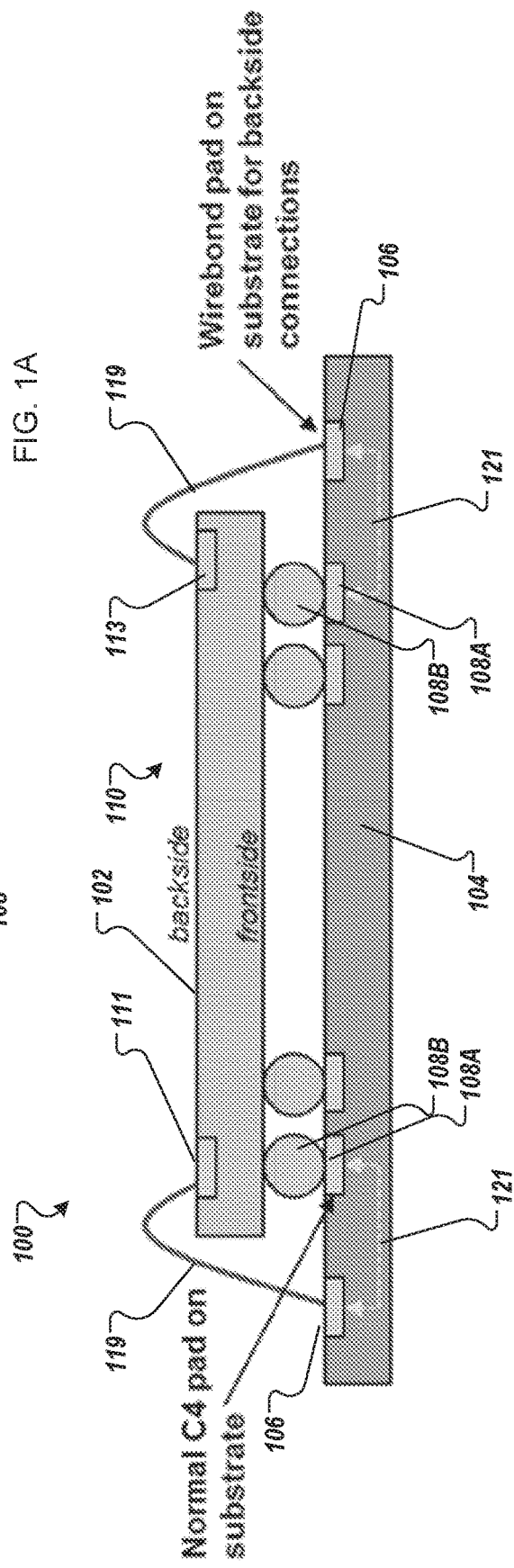
FIG. 1B is a side view of the chip on the substrate of FIG. 1A.

FIG. 1A is a perspective top-down view of a semiconductor package 100 having a chip 102 on a substrate 104 with wirebond pads 106 and substrate pads 108A connecting active circuitry on a front-side of the chip 102 to a tamper prevention structure 110 on a backside of the chip 102 according to one embodiment. FIG. 1B is a side view of the semiconductor package 100. In this embodiment, the tamper prevention structure 110 is a backside security mesh disposed on, or embedded at least partially within, the chip 102. The backside security mesh in the depicted embodiment has a specific pattern. In particular, the backside security mesh includes a first terminal 111, a second terminal 113, and multiple metal lines 115, and multiple intermediate terminals 117. The first terminal 111 is coupled to one of the wirebond pads 106 via a wire 119 and the second terminal 113 is coupled to one of the wirebond pads 106 via a wire 119. The wirebond pads 106 are coupled to substrate pads 108A via substrate conductive paths 121. The substrate pads 108A are on package substrate and coupled to the chip 102 via chip interconnects 108B (e.g., C4 solder bumps) that are attached to the chip 102. Flip-chip bonding can be used to form an interconnect between the chip 102 and the substrate 104 using the substrate pads 108A and the chip interconnects 108B.

In one embodiment, the chip 102 may include an active circuitry layer disposed on the front side of the chip 102. A circuit of the active circuitry layer can couple to the tamper prevention structure 110 via the chip interconnections 108B, the substrate pads 108A, substrate conductive paths 121, wirebond pads 106, wires 119, and first and second terminals 111, 113. The circuit can monitor electrical continuity between the first and second terminals 111, 113. If the tamper prevention structure 110 has been modified by an attacker, the circuit can detect the electrical discontinuity caused by the modification. In another embodiment, the circuit measures an impedance of the tamper prevention structure 110, such as between the first terminal 111 and the second terminal 113, to obtain a measured impedance value. The measured impedance value can be compared against a stored impedance value for the tamper prevention structure 110. The stored impedance value can be stored in non-volatile memory. Even if a portion of the metal is removed from the tamper prevention structure 110, the replaced metal has to result in the same impedance value as the one stored. The tamper prevention structure 110 can be used to prevent recovery of a state of digital circuits (e.g., SRAM contents) of circuitry on the chip 102.

In one embodiment, the chip interconnects 108B are first-level interconnects, such as C4 solder bumps, copper-pillar bumps, micro-bumps, or other first-level interconnects. The substrate pads 108A can be pads that accommodate the corresponding type of first-level interconnect, such as substrate pad that connects to the C4 solder bump (also referred to as a C4 pad), copper-pillar bump, micro-bump, or the like. In the depicted embodiment, the wirebond pads 106 can be wirebond pads that are used to connect wires 119 to the first and second terminals 111, 113 of the tamper prevention structure 110. In other embodiments, the wirebond pads 106 can be other multi-chip interconnects (e.g., other edge-bonding techniques). It should be noted that, in some cases, the tamper prevention structure 110 can absorb infrared emissions originating from the circuits beneath the tamper prevention structure 110.

Although not illustrated in FIGS. 1A-1B, the chip 102 may include a PUF circuit that is connected to the tamper prevention structure 110 and outputs a first fingerprint value. Any modification of an electrical characteristic (e.g., resistance, inductance, continuity, etc.) of the tamper prevention structure 110 at the backside of the chip 102 causes the PUF circuit to output a second fingerprint value that is not equal to the first fingerprint value.

In the depicted embodiment, the substrate conductive paths 121 (dashed lines in FIG. 1B) in the substrate 104 represent electrical connectivity between the substrate pads 108A (e.g., C4 pads) and the substrate's wirebond pads 106. For product-cost reasons, it would be beneficial to achieve overall connectivity using as few substrate layers as possible. A one-layer substrate, for example, could be used, where the substrate has additional wirebond pads (not shown) which route to the chip's normal power, ground, and IO pads.

Although the tamper prevention structure 110 has a specific design, in other embodiments, the tamper prevention structure 110 may include other patterns, such as those described herein, as well as others not illustrated or described.

It should be noted that FIGS. 1A-1B shows a representative security mesh on the backside of the chip 102. As described earlier, the electrical continuity of this security mesh can be monitored by on-chip circuits, so that an adversary cannot easily delete regions of the backside metal without having to reestablish connectivity (e.g., by depositing new connects via a Focused Ion Beam (aka, "FIB") failure-analysis tool). An alternative way to thwart an adversary as advanced as this would be to forego simple continuity measurements in favor of measurements that rely on the impedance (e.g., resistance) of the metal connections, such as illustrated in FIG. 2A.

Figure 2A:
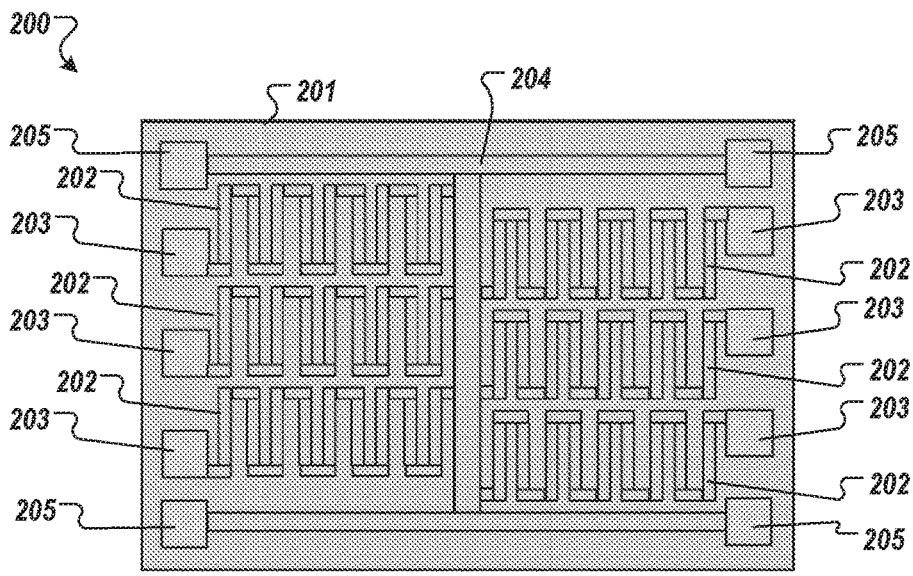
FIG. 2A is a top view of a backside security mesh having six metal resistors that each share a common terminal according to one embodiment.

FIG. 2A is a top view of a backside security mesh 200 having six metal resistors 202 that each share a common ground terminal 204 according to one embodiment. The backside security mesh 200 is disposed on a backside of an integrated circuit die 201. Each of the six metal resistors 202 are formed by a continuous metal line coupled between an end terminal 203 and the common ground terminal 204. In the depicted embodiment, the continuous metal line is in a tessellated pattern between one of the end terminals 203 and the common ground terminals 204. The common ground terminal 204 may be coupled to one or more end terminals 205. Each of the end terminals 205 and the end terminals 203 can be connected to interconnects on a substrate (illustrated in FIG. 2B). Alternatively, the continuous metal line can be other continuity-based patterns.

In one embodiment, the six "metal resistors" 202 formed on the backside of the integrated circuit die 201 could be sensed by circuits realized on the front side of the integrated circuit die 201. These sensed values could then be stored in some fashion in non-volatile memory of the integrated circuit die 201. During a secure operation being performed by one or more circuits of the integrated circuit die 201, measured impedance values could be checked against the stored values. If the measured impedance values are substantially different from the stored values, secure operations could be disabled. This approach could serve to significantly complicate the efforts of an adversary who attempted to remove a portion of the backside security mesh 200, for example, in order to observe the integrated circuit die's operation during secure processing. Not only would an attacker have to reestablish connectivity, the attacker would have to reproduce an impedance value of the metal removed.

Figure 2B:
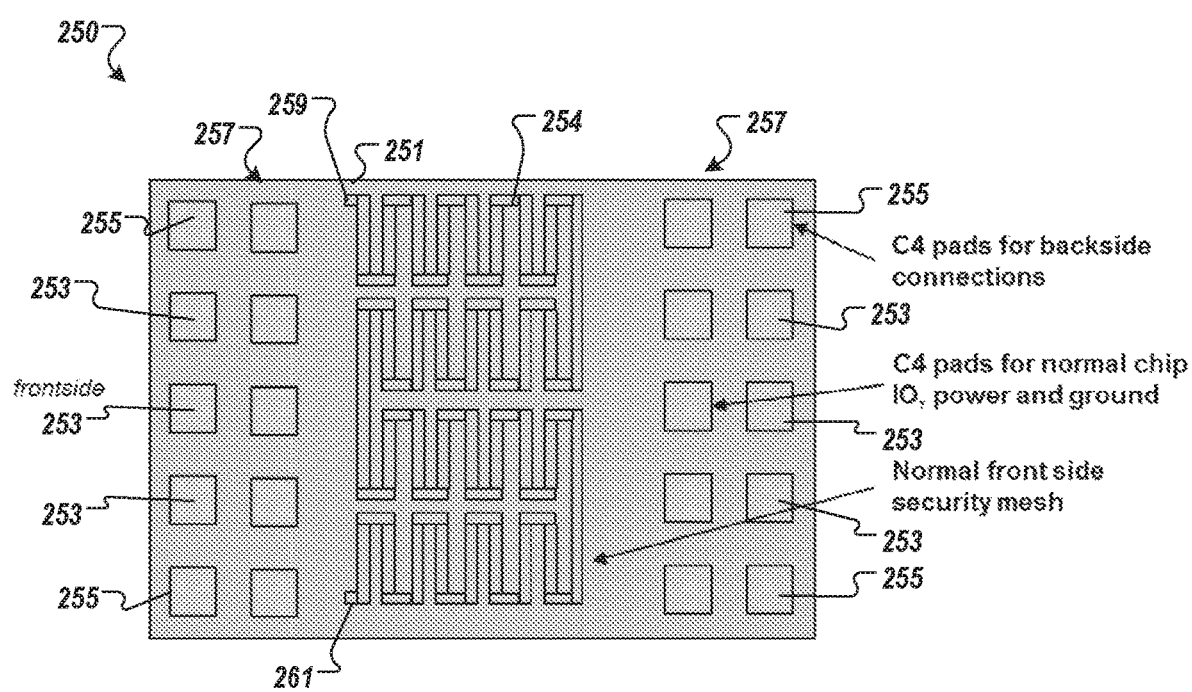
FIG. 2B is a top view of a front-side security mesh having a continuous conductive path according to one embodiment.

FIG. 2B is a top view of a front side security mesh 254 having a continuous conductive path according to one embodiment. The front side security mesh 254 is coupled between a first terminal 259 and a second terminal 261. The first terminal 259 and the second terminal 261 can be connected circuitry on the front side of the integrated circuit die 201. The front side security mesh 254 is shown as a single metal line that forms a continuity-based front side security mesh. This front-side security mesh 254 can be disposed to cover the circuitry on the front side of the integrated circuit die 201. Also shown in FIG. 2B are the C4 pads which are used to connect to the C4 terminals on the substrate, which in turn establish electrical connectivity to the backside secure mesh 200.

In another embodiment, a semiconductor package includes a substrate, a first-level interconnect terminal disposed on a first surface of the substrate and a backside interconnect terminal disposed on the first surface of the substrate. The backside interconnect terminal is coupled to the first-level interconnect terminal through the substrate. The semiconductor package further includes an integrated circuit having a front-side metal mesh; front-side active circuitry coupled to the first-level interconnect terminal and a backside metal mesh coupled to the backside interconnect terminal. In one embodiment, the first-level interconnect is a C4 solder bump and the backside interconnect is a wirebond. In another embodiment, the first-level interconnect is a copper-pillar bump and the backside interconnect is a wirebond.

In a further embodiment, the integrated circuit includes a PUF circuit coupled to both the front-side metal mesh and the backside metal mesh to output a first fingerprint value. A modification of an electrical characteristic of at least one of the backside metal mesh or the front-side metal mesh causes the PUF circuit to output a second fingerprint value that is not equal to the first fingerprint value. In a further embodiment, a key generation circuit is coupled to the PUF circuit. The key generation circuit derives a key for a cryptographic function at least in part on the first fingerprint value. In another embodiment, the integrated circuit includes a cryptographic circuit coupled to the PUF circuit. The PUF circuit disables the cryptographic circuit when the second fingerprint value is not equal to the first fingerprint value.

In another embodiment, a package includes a substrate having a first interconnect terminal of a first type and a second interconnect terminal of a second type. A first metal layer structure, such as a first security mesh structure, is disposed on a first side of an integrated circuit die. A second metal layer structure, such as a second security mesh structure, is disposed on a second side of the integrated circuit die. Active circuitry is disposed on the second side of the integrated circuit die and coupled to the second interconnect terminal. A substrate conductive path is coupled between the second interconnect terminal and the first interconnect terminal, and during packaging, the first interconnect terminal on the substrate is coupled to the first security mesh structure. The first side may be a backside of the integrated circuit die which itself is attached to the substrate in a flip-chip configuration where the second interconnect terminal is a C4 pad and the first interconnect terminal is a wirebond pad. The first side may not have any active circuitry.

In a further embodiment, a second metal layer structure, such as a second security mesh structure, is disposed on the second side to at least partially cover the active circuitry on the second side. This may be a second security mesh structure or a front-side security mesh, whereas the first metal layer structure is a first security mesh or a backside security mesh.

In a further embodiment, a semiconductor package includes a flip-chip integrated circuit having a front side and a backside. The flip-chip integrated circuit includes an active circuitry layer on the front side of the flip-chip integrated circuit and a backside metal structure disposed on the backside of the flip-chip integrated circuit. A circuit in the active circuitry layer is coupled, via the packaging, to the backside metal structure and configured to detect a modification of an electrical characteristic of the backside metal structure. In one embodiment, the backside metal structure includes multiple terminals, a ground terminal, and multiple metal conductors. Each of the metal conductors is coupled between one of the multiple terminals and the ground terminal. The circuit in the active circuitry layer is coupled to the backside metal structure and configured to detect a modification of an impedance of any one or more of the multiple metal conductors of the backside metal structure. In another embodiment, the backside metal structure is a security metal mesh with metal conductors organized as a continuous conductive path between a first terminal and a second terminal. The circuit is configured to detect continuity of the conductive path between the first terminal and the second terminal. In a further embodiment, a front-side metal structure is disposed on the front side of the flip-chip integrated circuit. The circuit is coupled to the backside metal structure and configured to detect a modification of any electrical characteristic of at least one of the front-side metal structure and the backside metal structure. In one embodiment, the front-side metal structure is a security metal mesh having multiple metal conductors organized as a continuous conductive path between a first terminal and a second terminal and the circuit is configured to detect continuity of the conductive path between the first terminal and the second terminal.

Figure 3:
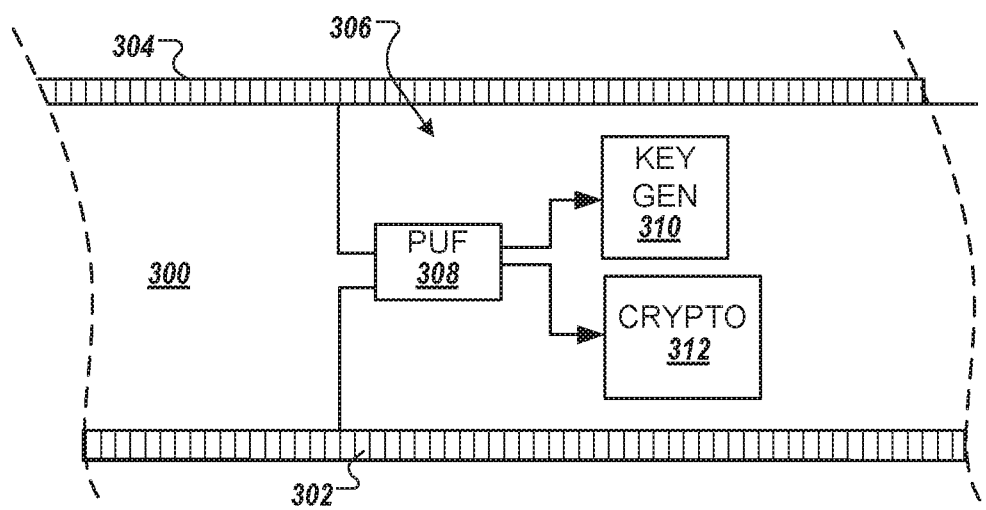
FIG. 3 is a side view of an integrated circuit die having a front-side metal mesh on a front side, a backside metal mesh on a backside, and active circuitry according to one embodiment.

FIG. 3 is a side view of an integrated circuit die 300 having a front-side metal mesh 302 on a front side, a backside metal mesh 304 on a backside, and active circuitry 306 according to one embodiment. The front-side metal mesh 302 and the backside metal mesh 304 are coupled to the active circuitry 306. It should be noted that the connections illustrated in FIG. 3 are not the actual connections since the backside metal mesh 304 is coupled to the active circuitry via first-level interconnections and backside interconnects as described above with respect to FIGS. 2A-2B.

In the depicted embodiment, the active circuitry 306 includes a PUF circuit 308, a key generation circuit 310, and a cryptographic circuit 312. The PUF circuit 308 can generate a fingerprint value based on the uniqueness of the physical characteristics (e.g., resistance, capacitance, connectivity, etc.) of one or more tamper prevention structures (also referred to as shielding structures, such as the front-side metal mesh 302, the backside metal mesh 304, or both). The physical characteristics depend on random physical factors introduced during manufacturing. This causes the chip-to-chip variations in these physical characteristics to be unpredictable and uncontrollable which makes it virtually impossible to duplicate, clone, or modify the structure without changing the fingerprint value. Thus, by including the metallization on the backside of the integrated circuit as part of the PUF, the backside of the chip can be protected from modifications and/or observations that can be used to help learn the secure cryptographic keys and/or circumvent the secure circuitry. Similarly, by including the metallization on the front side and the backside of the integrated circuit as part of the PUF, the chip can be protected on both sides from modifications and/or observations.

In one embodiment, the PUF circuit 308 outputs a fingerprint value that is a seed for a key generation circuit 310. The key generation circuit 310 can derive a key, e.g., for a cryptographic function, at least in part on the fingerprint value from the PUF circuit 308.

In another embodiment, the PUF circuit 308 outputs a fingerprint value that is used to confirm whether there has been tampering to, for example, disable or modify the normal operational flow of a cryptographic circuit 312. For example, the cryptographic circuit 312 can compare the fingerprint value generated by the PUF circuit 308 against a stored fingerprint value stored in non-volatile memory. The stored fingerprint value can be stored, for example, during manufacturing when there has been no tampering with the front-side metal mesh 302 and the backside metal mesh 304. Any modification to the front-side metal mesh 302, the backside metal mesh 304, or both results in the PUF circuit 308 generating a second fingerprint value that is not equal to the stored fingerprint value (e.g., the first fingerprint value generated by the PUF circuit 308 before deployment of the integrated circuit, such as at manufacturing or test stages of the integrated circuit lifecycle). Alternatively, the active circuitry 306 can include more or less circuits than those illustrated and described with respect to FIG. 3. For example, the active circuitry 306 can include an impedance measurement circuit that measures an impedance value of the backside metal mesh 304 and compares the impedance value against a stored impedance value corresponding to the backside metal mesh 304 to detect a change in the backside metal mesh 304. The impedance measurement circuit can disable a cryptographic operation, such as by the cryptographic circuit 312, when there is a change in the backside metal mesh 304.

In another embodiment, the impedance measurement circuit measures a first impedance of the backside metal mesh 304 and compares the first impedance value against a first stored impedance value corresponding to the backside metal mesh 304 to detect a change in the backside metal mesh 304. The impedance measurement circuit measures a second impedance of the front-side metal mesh 302 and compares the second impedance against a second stored impedance value corresponding to the front-side metal mesh 302 to detect a change in the front-side metal mesh 302. The impedance measurement circuit can disable a cryptographic operation when there is a change in the front-side metal mesh 302 or a change in the backside metal mesh 304.

In another embodiment, the active circuitry 306 includes a continuity-check circuit coupled to the backside metal mesh 304 and/or the front-side metal mesh 302. The continuity-check circuit is configured to check continuity of the backside metal mesh 304, the front-side metal mesh 302, or both.

Figure 4A:
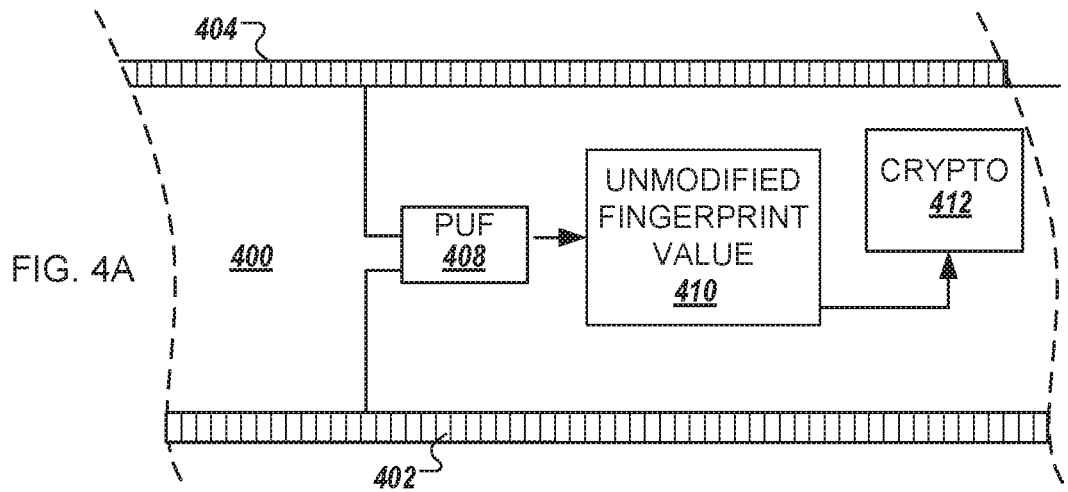
FIG. 4A is a side view of an integrated circuit die having a front-side metal layer structure on a front side, a backside metal layer structure on a backside, and a physically unclonable function (PUF) circuit according to one embodiment.

FIG. 4A is a side view of an integrated circuit die 400 having a front-side metal layer structure 402 on a front side, a backside metal layer structure 404 on a backside, and a PUF circuit 408 according to one embodiment. The front-side metal layer structure 402 and the backside metal layer structure 404 are coupled to the PUF circuit 408. It should be noted that the connections illustrated in FIG. 4A are not the actual connections since the backside metal layer structure 404 is coupled to the active circuitry via first-level interconnections and backside interconnects as described above with respect to FIGS. 2A-2B.

In the depicted embodiment, the PUF circuit 408 generates an unmodified fingerprint value 410 based on the uniqueness of the physical characteristics (e.g., resistance, capacitance, connectivity, etc.) of the front-side metal layer structure 402, the backside metal layer structure 404, or both. By including the metallization on the backside metal layer structure 404 as part of the PUF circuit, the backside of the integrated circuit die 400 can be protected from modifications and/or observations that can be used to help learn the secure cryptographic keys and/or circumvent the secure circuitry.

As illustrated, unmodified fingerprint value 410 is illustrated as coming from PUF circuit 408 and being provided to cryptographic circuitry 412. Front-side metal layer structure 402 comprises metal that is deposited on one or more routing layers relative to a substrate layers (a.k.a., metal 1 layer, metal 2 layer, metal 3 layer, etc.). Instead of using TSVs, the backside metal layer structure 404 is coupled to the PUF circuit 408 via a first-level interconnect that is connected, via the substrate, to a backside interconnect (e.g., a wirebond). The backside interconnect is coupled to a terminal of the backside metal layer structure 404, such as via a bond wire. In some embodiments, PUF circuit 408 is only connected to the backside metal layer structure 404. In some embodiments, the PUF circuit 408 is connected to both the front-side metal layer structure 402 and the backside metal layer structure 404, as illustrated in FIG. 4A. The PUF circuit 408 and the front-side metal layer structure 402 can be disposed on the front side of the integrated circuit die 400 (a.k.a. the 'front' or 'top' side of integrated circuit die 400). The backside metal layer structure 404 can be disposed on the other side of the integrated circuit die 400 that does not include active circuitry (a.k.a. the 'back' or 'bottom' side of integrated circuit die 400).

Since the backside metal layer structure 404 is connected to PUF circuit 408, the backside metal layer structure 404 is thereby integrated as part of active PUF circuit 408. Thus, a modification to any one of backside metal layer structure 404 that is connected to PUF circuit 408 (e.g., during a FIB attack) would change the fingerprint value output by PUF circuit 408 to one that is different from unmodified fingerprint value 410. If unmodified fingerprint value 410 is used by cryptographic circuitry 412, to scramble, encrypt, configure the operational flow of a crypto processor, or derive a value used to scramble or encrypt data stored on the chip (e.g., data stored in an on-chip non-volatile memory), changing the fingerprint value output by PUF circuit 408 to one that is different from unmodified fingerprint value 410 destroys the usability of the encrypted data stored on the chip. PUF circuit 408 relies on different naturally-mismatched physical properties of integrated circuits (and backside metal layer structure 404, in particular) to produce unmodified fingerprint value 410. Backside metal layer structure 404 is connected to PUF circuit 408 so that the naturally-mismatched physical properties of backside metal layer structure 404 affects the value output by PUF circuit 408. For example, PUF circuit 408 may rely (at least in part) on the slight mismatch of resistances formed by two or more backside metal layer structure 404 to generate unmodified fingerprint value 410. These unpredictable variations in resistance across or between two metal lines of the backside metal layer structure 404 are used by PUT circuit 408 to determine unmodified fingerprint value 410. Thus, when these unpredictable variations in resistance across or between backside metal layer structure 404 are changed by, for example, a modification to a backside metal layer structure 404, the fingerprint value output by PUF circuit 408 is changed to one that is different from unmodified fingerprint value 410.

By using backside metal layer structures 404 (when appropriately designed and laid out), as part of PUF circuit 408, integrated circuit die 400 is made more resistant to several types of attacks. These include, but are not limited to photonic emission attacks and FIB attacks. Photonic emission attacks are resisted because the backside metal layer structure 404 absorbs the near-infrared signals that are typically collected during this attack. Thus, removing all or part of a backside metal layer structure 404 so that the emissions of a sensitive active circuit on the front side can be observed causes the fingerprint value output by PUF circuit 408 to change to a value that is different from unmodified fingerprint value 410. This change in the fingerprint value output by PUF circuit 408 can be used to detect this tampering and/or render protected data on integrated circuit die 400 unusable/unrecoverable. In particular, when the changed fingerprint value output by PUF circuit 408 is input (e.g., as a key or key seed) to cryptographic circuitry 412, unmodified fingerprint value 410 is lost and therefore not available to decrypt information that was encrypted with unmodified fingerprint value 410. Likewise, a FIB attack that modifies a backside metal layer structure 404 causes the fingerprint value output by PUF circuit 408 to change to a value that is different from unmodified fingerprint value 410.

In an embodiment, PUF circuit 408 is configured to apply a first electrical stimulus to backside metal layer structure 404. This electrical stimulus is applied through the electrical connectivity of the first-level interconnect and the backside interconnect described herein. For example, PUF circuit 408 may be configured to apply a supply or other known voltage to backside metal layer structure 404 using a C4 pad that is coupled to a wirebond pad that is coupled to a wire that is coupled to the backside metal layer structure, such as illustrated with respect to FIGS. 1A-1B. PUF circuit 408 is also configured to receive a response by backside metal layer structure 404 to this electrical stimulus. This response is based at least in part on an electrical characteristic of backside metal layer structure 404. This response may be received using the same connection or a similar connection via a different terminal. Based at least in part on the electrical characteristics of the backside metal layer structure 404, PUF circuit 408 outputs unmodified fingerprint value 410 when backside metal layer structure 404 has not been modified. Based at least in part on the electrical characteristics of the backside metal layer structure 404, PUF circuit 408 outputs a fingerprint value that is different from the unmodified fingerprint value 410 when a backside metal layer structure 404 has been modified.

In an embodiment, PUF circuit 408 may be connected to one or more front-side metal structures 402 such that unmodified fingerprint value 410 is also based on the electrical characteristics of a front-side metal layer structure 402. Thus, when a front-side metal layer structure 402 has been modified, PUF circuit 408 outputs a fingerprint value that is different from unmodified fingerprint value 410. This new fingerprint value is based on the electrical characteristics of at least one front-side metal layer structures 402

In an embodiment, one or more of front-side metal layer structures 402 and/or one or more backside metal layer structures 404 may comprise an anti-tamper mesh. For example, backside metal layer structure 404 may be designed and laid out as a mesh of metal lines that are relatively difficult to modify without causing a conductive path to form (or be destroyed) between parts of the mesh. This mesh may also be designed and laid out so that even relatively small modifications to the mesh cause one or more electrical characteristics (e.g., resistance, inductance, etc.) of the mesh to be changed enough to cause the unmodified fingerprint value 410 output by PUF circuit 408 to change to a different value.

Figure 4B:
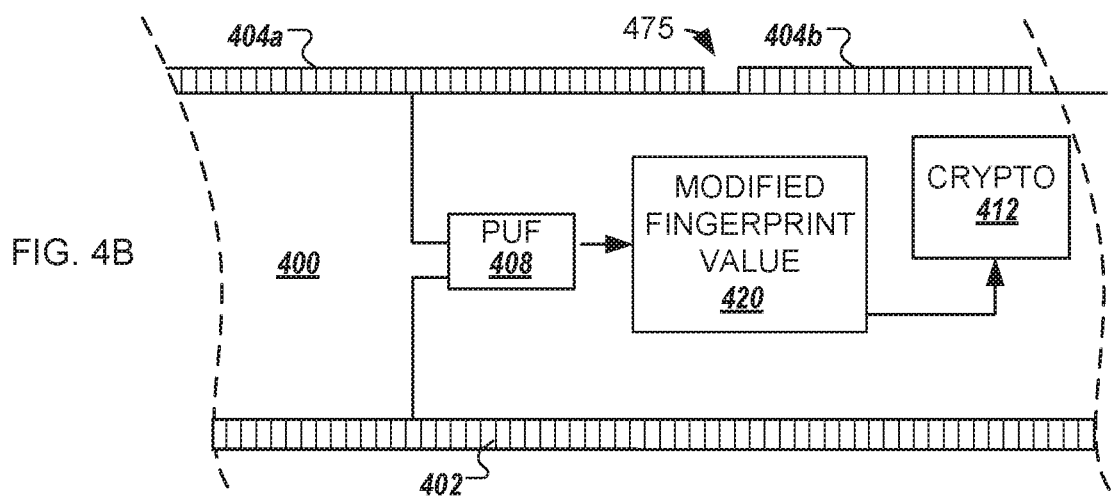
FIG. 4B is an illustration of the integrated circuit die of FIG. 4A where a backside metal layer structure has been modified by removing material according to one embodiment.

FIG. 4B is an illustration of the integrated circuit die 400 of FIG. 4A where a backside metal layer structure 404 has been modified by removing material according to one embodiment. In FIG. 4B, part of backside metal structure 404 (shown in FIG. 2A) is illustrated as having been opened (i.e., modified—e.g., by a FIB machine) so that (at least for the cross-section shown in FIG. 4B) two separate backside metal structures 404a and 404b are separated by an opening 475. Opening 475 may have been made in order to observe or access circuitry via the backside of integrated circuit die 400. In an embodiment, the creation of opening 475 changes the electrical characteristics of the backside metal structure 404 shown in FIG. 2A (e.g., opening 475 changes the resistance, capacitance, connections with, and/or inductance of backside metal structure 404) such that PUF circuit 408 now outputs a modified fingerprint value 222 that is different from unmodified fingerprint value 410.

Figure 4C:
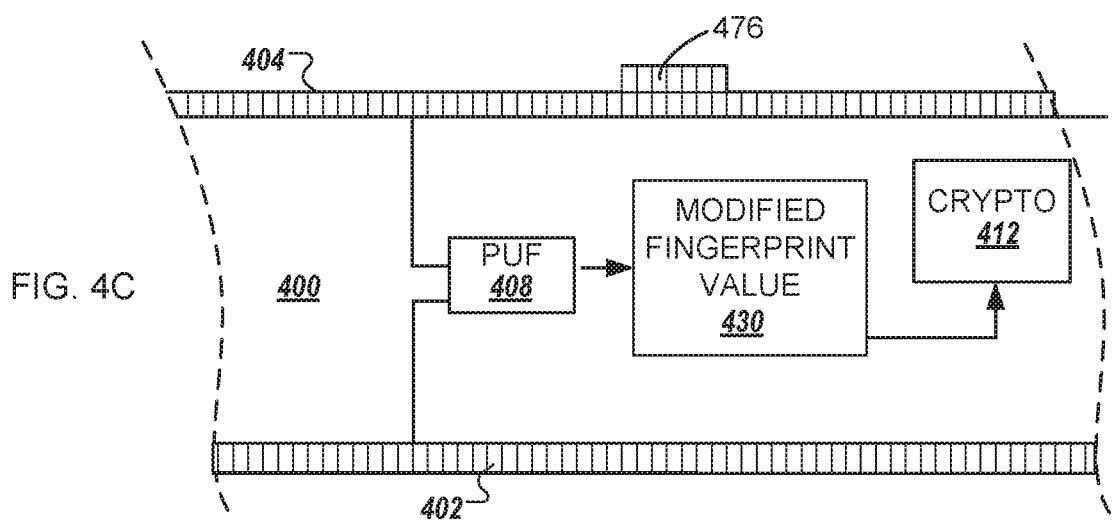
FIG. 4C is an illustration of the integrated circuit die of FIG. 4A where a backside metal layer structure has been modified by adding material according to one embodiment.

FIG. 4C is an illustration of the integrated circuit die 400 of FIG. 4A where a backside metal layer structure 404 has been modified by adding material according to one embodiment. In FIG. 4C, backside metal structure 404 is illustrated as having been connected to another portion of metal (not illustrated) by added material and/or metal 476. The metal 476 can connect one metal line of the backside metal layer structure 404 and another metal line of the backside metal layer structure 404. Metal 476 may have deposited in order to electrically observe, circumvent, and/or access circuitry via the backside of integrated circuit die 400. In an embodiment, the addition of metal 476 changes the electrical characteristics of at least one of backside metal structure 404 (e.g., metal 476 changes the resistance, capacitance, connections with, and/or inductance of at least one of backside metal structures 404) such that PUF circuit 408 now outputs a modified fingerprint value 430 that is different from unmodified fingerprint value 410.

In another embodiment, metal may be added or removed from the front-side metal layer structure 402 to change the electrical characteristics of the front-side metal layer structure 402 similarly as shown in FIGS. 2B-2C with respect to the backside metal layer structure 404. The addition or removal of metal to the front-side metal layer structure 402 changes the electrical characteristics of the front-side metal structure 402 (e.g., changes the resistance, capacitance, connections with, and/or inductance of the front-side metal structure 402) such that PUF circuit 408 would output a modified fingerprint value that is different from unmodified fingerprint value 410.

FIG. 5 is a flowchart illustrating a method 500 of detecting modifications to a backside metal layer according to one embodiment. The operations in FIG. 5 may be performed by one or more elements of chip 102 of FIG. 1B, integrated circuit die 201 of FIG. 2A, integrated circuit die 300 of FIG. 3, and/or integrated circuit die 400 of FIG. 4. By way of a first first-level to backside interconnection described above with respect to FIGS. 1A-1B, an electrical stimulus is applied to a backside metal layer (block 502). For example, PUF 220 may apply a voltage and/or current to one or more of the backside metal layer structures described above with respect to FIGS. 1A-4C via one of the first-level interconnects (e.g., C4 bumps) that is connected through the substrate with one of the backside interconnects (e.g., wirebond pads). A wire, for example, can connect the backside interconnect to a substrate terminal that is coupled to a front side C4 pad/bump.

By way of the same first-level to backside interconnection (or a different first-level to backside interconnection), a response to the electrical stimulus that is based at least in part on an electrical characteristic of the backside metal layer is received (block 504). For example, PUF circuit 220 may receive a voltage response to an applied current stimulus by way of a conductive path from the backside metal layer structure, through a bondwire that is attached to a wirebond pad on the substrate which itself is connected through the substrate to a first-level interconnection (e.g., a C4 pad/bump). The first-level interconnect couples to the active circuitry to perform the method 500. This response may be based on an electrical characteristic (e.g., one or more of resistance, capacitance, connectivity of, and/or inductance of, at least one of backside metal structures). The stimulus may be a voltage or current, for example, and the resulting response may be, for example, a current or voltage.

A physically unclonable function (PUF) outputs, based at least in part on the electrical characteristic of the backside metal layer, a first fingerprint value when the backside metal layer has not been modified, where the PUF is to output, based at least in part of the electrical characteristic of the backside metal layer, a second fingerprint value that is not equal to the first fingerprint value if the backside metal layer has been modified (block 504). For example, the PUF may, based on an electrical characteristic of one or more of backside metal structures described herein, output an unmodified fingerprint value when none of the backside metal structures have been modified. PUF may also be configured to, based on an electrical characteristic of one or more of backside metal structures, output a modified fingerprint value when at least one of the backside metal structures have been modified.

The methods, systems, and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of integrated circuits, integrated circuit dies, interconnects, etc., described above with respect to FIGS. 1A-4C. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GUSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 6:
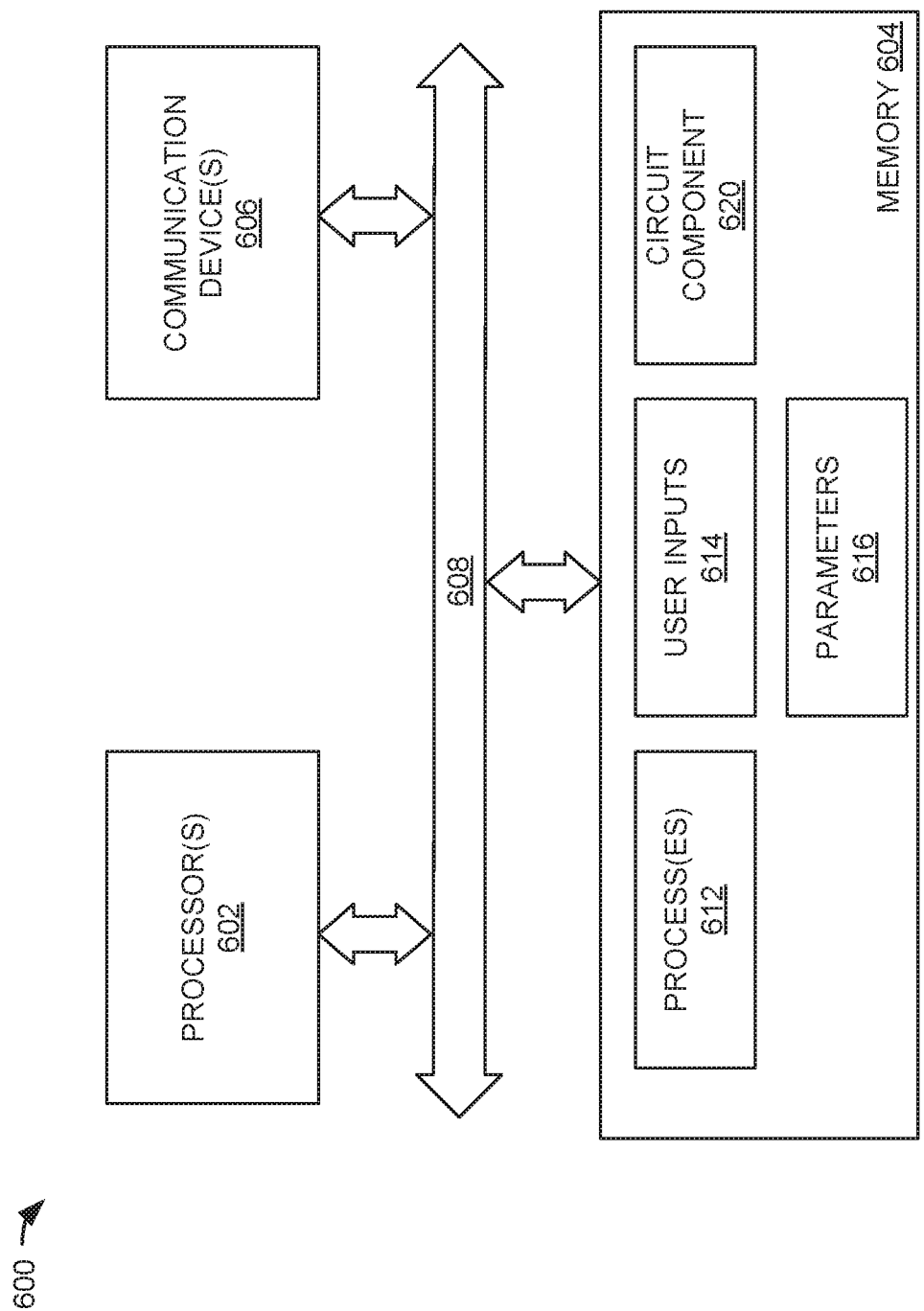
FIG. 6 is a block diagram illustrating one embodiment of a processing system for including, processing, or generating, a representation of a circuit component according to one embodiment.

FIG. 6 is a block diagram illustrating one embodiment of a processing system 600 for including, processing, or generating, a representation of a circuit component 620 according to one embodiment. Processing system 600 includes one or more processors 602, a memory 604, and one or more communications devices 606. Processors 602, memory 604, and communications devices 606 communicate using any suitable type, number, and/or configuration of wired and/or wireless connections 608.

Processors 602 execute instructions of one or more processes 612 stored in a memory 604 to process and/or generate circuit component 620 responsive to user inputs 614 and parameters 616. Processes 612 may be any suitable electronic design automation (EDA) tool or portion thereof used to design, simulate, analyze, and/or verify electronic circuitry and/or generate photomasks for electronic circuitry. Representation 620 includes data that describes all or portions of the chip 102 of FIG. 1B, integrated circuit die 201 of FIG. 2A, integrated circuit die 300 of FIG. 3, and/or integrated circuit die 400 of FIG. 4, and their components, as shown and described with respect to FIGS. 1A-5.

Representation 620 may include one or more of behavioral, register transfer, logic component, transistor, and layout geometry-level descriptions. Moreover, representation 620 may be stored on storage media or communicated by carrier waves.

Data formats in which representation 620 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 614 may comprise input parameters from a keyboard, mouse, voice recognition interface, microphone and speakers, graphical display, touch screen, or other type of user interface device. This user interface may be distributed among multiple interface devices. Parameters 616 may include specifications and/or characteristics that are input to help define representation 620. For example, parameters 616 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 604 includes any suitable type, number, and/or configuration of non-transitory computer-readable storage media that stores processes 612, user inputs 614, parameters 616, and circuit component 620.

Communications devices 606 include any suitable type, number, and/or configuration of wired and/or wireless devices that transmit information from processing system 600 to another processing or storage system (not shown) and/or receive information from another processing or storage system (not shown). For example, communications devices 606 may transmit circuit component 620 to another system. Communications devices 606 may receive processes 612, user inputs 614, parameters 616, and/or circuit component 620 and cause processes 612, user inputs 614, parameters 616, and/or circuit component 620 to be stored in memory 604.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The above description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

The description above includes specific terminology and drawing symbols to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multiconductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology, or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "de-asserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or de-asserts, if explicitly stated or indicated by context) the signal on a signal line coupled between the signal driving and signal receiving circuits. A signal line is said to be "activated" when a signal is asserted on the signal line, and "deactivated" when the signal is de-asserted. Additionally, the prefix symbol "/" attached to signal names indicates that the signal is an active low signal (i.e., the asserted state is a logic low state). A line over a signal name $$\left(\text{e.g., }\text{`}\overline{\text{<signal name>}}\text{'}\right)$$

is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement. While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:
1. A package comprising:
   a substrate comprising a first interconnect terminal of a first type and a second interconnect terminal of a second type;
   a first security mesh structure disposed on a first side of an integrated circuit die;

a second security mesh structure disposed on a second side of the integrated circuit die;

active circuitry disposed on the second side of the integrated circuit die and coupled to the second interconnect terminal; and a substrate conductive path coupled between the second interconnect terminal and the first interconnect terminal, the first interconnect terminal being coupled to the first security mesh structure, wherein:

the first security mesh structure comprises:
- a common ground terminal, the common ground terminal being coupled to a third interconnect terminal of the substrate;
- a first conductive line coupled between the common ground terminal and a first terminal, the first terminal being coupled to the first interconnect terminal; and
- a second conductive line coupled between the common ground terminal and a second terminal, the second terminal being coupled to a fourth interconnect terminal of the substrate; and the active circuitry is to measure a first impedance value between the first interconnect terminal and the third interconnect terminal and a second impedance value between the third interconnect terminal and the fourth interconnect terminal.

2. The package of claim 1, wherein the first side is a backside of the integrated circuit die that is attached to the substrate in a flip-chip configuration, wherein the second interconnect terminal is a controlled collapse chip connection (C4) pad, and wherein the first interconnect terminal is a wirebond pad.

3. The package of claim 1, further comprising a circuit coupled to the first security mesh structure and the second security mesh structure, wherein the circuit is configured to check electrical continuity of at least one of the first security mesh structure or the second security mesh structure.

4. The package of claim 1, wherein the active circuitry comprises a first circuit coupled to the first security mesh structure and a second circuit coupled to the second security mesh structure, wherein the first circuit is to measure the first impedance value and the second impedance value, and wherein the second circuit is configured to measure an impedance value of the second security mesh structure.

5. The package of claim 1, wherein the active circuitry comprises:
- a first circuit to perform a cryptographic operation; and
- a second circuit coupled to the first circuit, the first security mesh structure, and the second security mesh structure, wherein the second circuit is configured to:
  - measure the first impedance value of the first conductive line;
  - compare the first impedance value against a first stored impedance value corresponding to the first conductive line to detect a change in the first conductive line;
  - measure a second impedance value of the second security mesh structure;
  - compare the second impedance value against a second stored impedance value corresponding to the second security mesh structure to detect a change in the second security mesh structure; and
  - disable the cryptographic operation when there is a change in the first security mesh structure or a change in the second security mesh structure.

6. The package of claim 1, wherein the active circuitry comprises:
- a first circuit to perform a cryptographic operation; and
- a second circuit coupled to the first circuit and the first security mesh structure, wherein the second circuit is configured to:
  - measure the first impedance value of the first conductive line;
  - compare the first impedance value against a stored impedance value corresponding to the first conductive line to detect a change in the first conductive line; and
  - disable the cryptographic operation when there is a change in the first conductive line.

7. The package of claim 1, wherein the first security mesh structure is a backside security mesh, wherein the integrated circuit die comprises
a physically unclonable function circuit coupled to the backside security mesh to output a first fingerprint value, wherein a modification of an electrical characteristic of the backside security mesh causes the physically unclonable function circuit to output a second fingerprint value that is not equal to the first fingerprint value.

8. The package of claim 1, wherein the second security mesh structure is a front-side security mesh, wherein the first security mesh structure is a backside security mesh, wherein the integrated circuit die comprises
a physically unclonable function circuit coupled to the front-side security mesh and the backside security mesh to output a first fingerprint value, wherein a modification of an electrical characteristic of at least one of the backside security mesh or the front-side security mesh causes the physically unclonable function circuit to output a second fingerprint value that is not equal to the first fingerprint value.

9. The package of claim 1, wherein the first security mesh structure comprises a first mesh comprising a plurality of conductive lines organized in a first pattern, the plurality of conductive lines comprises the first conductive line and the second conductive line, wherein the first mesh comprises:
- a first resistor formed by the first conductive line coupled between the first terminal and the common ground terminal; and
- a second resistor formed by the second conductive line coupled between the second terminal and the common ground terminal, wherein:

the package further comprises a physically unclonable function circuit connected to the first terminal and the second terminal of the first mesh and to output a first fingerprint value; and a modification of an electrical characteristic of at least one of the first resistor or the second resistor causes the physically unclonable function circuit to output a second fingerprint value that is not equal to the first fingerprint value.

* * * * *